R. B. HASTINGS.
AUTOMOBILE LOCK.
APPLICATION FILED OCT. 28, 1919.

1,406,854. Patented Feb. 14, 1922.
2 SHEETS—SHEET 1.

Inventor
R. B. Hastings
By Norman J. Whitaker
His attorney

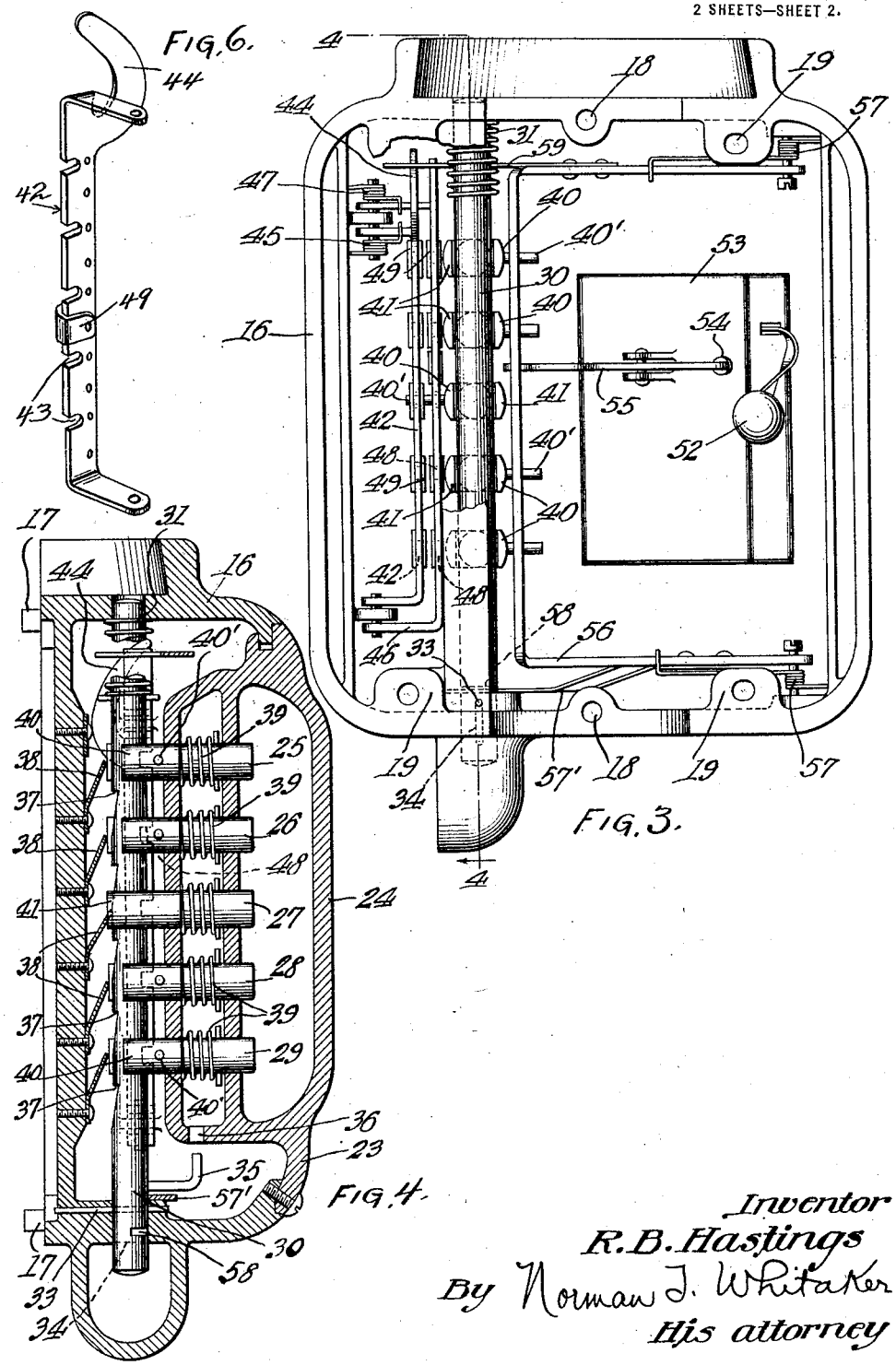

UNITED STATES PATENT OFFICE.

ROBERT BRUCE HASTINGS, OF PITTSBURGH, PENNSYLVANIA.

AUTOMOBILE LOCK.

1,406,854.  Specification of Letters Patent.  Patented Feb. 14, 1922.

Application filed October 28, 1919. Serial No. 333,899.

*To all whom it may concern:*

Be it known that I, ROBERT B. HASTINGS, a citizen of the United States, and a resident of Pittsburgh, in the county of Allegheny and State of Pennsylvania, have invented new and useful Improvements in Automobile Locks, of which the following is a specification.

This invention relates to automobile locks of the combination type and has particular references to that class of locks adapted for connection with the steering wheel of the vehicle.

An important object of the invention is to provide in a lock of the above mentioned character a means whereby the steering wheel may be locked in any desired position without the use of keys or the like and retained in a given locked position until the proper elements thereof are actuated singly or in order as the case may be to release the several cooperating elements from their locked positions.

A further object of the invention is to provide in a lock of the above mentioned character a means whereby an audible alarm or signal may be actuated to inform the public at large that someone not familiar with the combination is endeavoring to release the steering wheel from its locked position for an obvious purpose.

A further object of the invention is to provide in a lock of the above mentioned character a means whereby the proper combination for the release of several cooperating elements from their locked positions may be easily changed to produce a multiplicity of combinations.

A further object of the invention is to provide in a device of the above mentioned character a means whereby the several co-operating elements thereof may be easily assembled, disassembled or rearranged to set up a new or selected combination.

Other objects and advantages of the invention will be apparent during the course of the following description taken in connection with the accompanying drawings.

Figure 1:
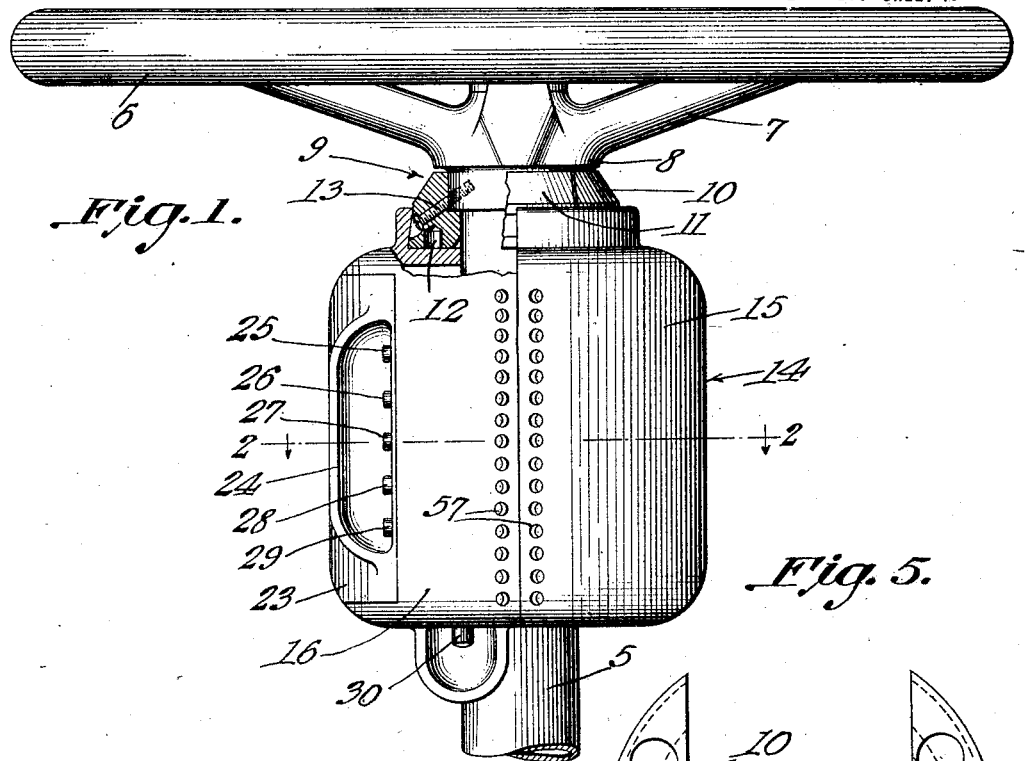
Figure 5:
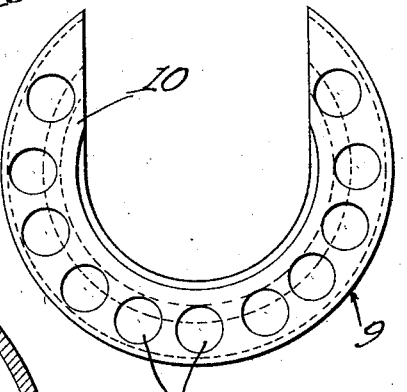
Figure 2:
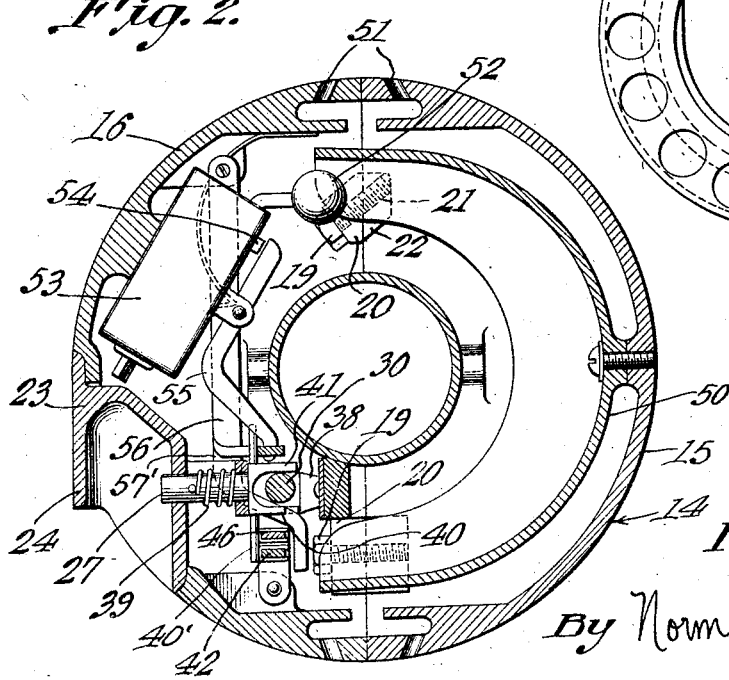

In the drawings, forming a part of this specification and wherein like numerals are employed to designate like parts throughout the same, Figure 1 is a side elevation of the device embodying my invention, the device being shown as applied to the steering wheel or steering column of a motor vehicle, Figure 2 is a horizontal sectional view taken on line 2—2 of Figure 1, Figure 3 is an internal view of a section or a half of the device, Figure 4 is a vertical sectional view taken substantially on line 4—4 of Figure 3, Figure 5 is a face view of a segment of a hub collar plate, and, Figure 6 is a perspective view of a cam rail.

In the drawings, wherein for the purpose of illustration is shown a preferred form of my invention, the numeral 5 indicates a steering column having secured at its upper end a steering wheel 6, the steering wheel being provided with spokes 7 radiating from a hub 8. To the hub 8 there is secured a sectional hub collar plate which is indicated as a whole by the numeral 9. This plate comprises two sections, one of which is indicated by the numeral 10, the other being indicated by the numeral 11. The hub collar plate 9 is provided with a plurality of openings 12 arranged in an arcuate or circular row and is secured to the hub 8 by means of suitable screws or the like as shown at 13.

The hub collar plate 9 is adapted for engagement with a casing indicated as a whole by the numeral 14, the casing being adapted to encircle the steering column 5 and the hub collar plate 9 when placed in position upon the steering column as shown in Figure 1. The casing 14 comprises two segments or shells indicated by the numerals 15 and 16. When the segments or shells 15 and 16 are placed in position upon the steering column dowel pins 17 carried by the section 16 enter openings 18 provided in steering column 5, the dowel pins 17 being clearly shown in Figure 4 and the openings 18 being clearly shown in Figure 3. The sections 15 and 16, when placed in their respective positions shown in Figure 1, are secured together by means of screws 19 passed through lugs 20 provided by section 16, the screws 19 being adapted for screw-thread engagement within the openings 21 provided within lugs 22 carried by the section 15.

The section 16 is provided with a detachable cover plate 23 having a push button guard 24 formed integral therewith for the concealment of push buttons 25, 26, 27, 28 and 29 hereinafter more particularly referred to. Within the section 16 there is arranged a vertically movable lock rod or plunger 30 which is adapted to extend into any one of the openings 12, the rod 30 being urged normally in a downward direction by means of the encircling coil spring 31. The rod 30 is prevented from rotating within its bearings by means of a pin or key 33 passed transversely therethrough and operating within an elongated slot 34. The rod 30 is further provided with a lock pin 35, the end of which is adapted to enter aperture 36 provided within the cover plate 23 and serves as a means for further locking the plate 23 to the section 16 when the rod 30 is moved to an elevated position. The rod 30 is provided with a plurality of lock notches 37 corresponding in number to the number of push buttons hereinafter referred to. To a side of the section 16 there is secured a plurality of spring detents 38 which are adapted to enter under certain conditions the lock notches 37.

The push buttons 25 to 29 inclusive hereinbefore referred to are normally urged outward by means of encircling coil springs 39 and are provided at their inner ends with arms 40 and 41, the arms 40 being shorter than arm 41 as clearly shown in Figure 2 and provided with an elongated pin 40'. These arms as shown are adapted to encircle the rod 30 when the various elements are assembled with respect to each other as clearly shown in Figure 2. The short arm 40 carries a tripping stud 40' the function of which will be more readily understood when considering the hereinafter described operation of the device. To the wall of section 16 there is pivotally connected a cam rail indicated as a whole by the numeral 42, the cam rail 42 being provided with a plurality of notches 43 and has secured at its upper end an arcuate shaped cam member 44. The cam rail 42 is, by means of spring 45, urged normally in the same direction as that of the push buttons 25 to 29 inclusive. In proximity to the cam rail 42 there is pivotally connected a bridge rail 46 which by means of spring 47 is urged in the same direction as the cam rail 42 and is provided with a plurality of notches 48 which correspond in size and number with the notches 43. The cam rail 42 and bridge rail 46 are each provided with a plurality of clasps 49 which correspond in number to the number of notches and are adapted to be moved to a position intermediate the notches or directly thereover.

To the inner wall of section 15 there is secured an arcuate shaped alarm bell 50, the sound waves or vibrations from which pass through openings 51. The alarm bell 50 is adapted to be sounded by means of a bell hammer 52 intermittently actuated by means of a suitable spring tension alarm actuating mechanism indicated as a whole by the numeral 53. The alarm mechanism 53 carries a suitable trip 54 which when depressed by lever 55, as will hereinafter be more fully described, permits escapement of the spring tension and consequently the vibration or intermittent actuation of the bell hammer 52.

To the wall of the casing 16 there is pivotally connected an alarm trip-rail 56 which is suitably pivoted to said wall and normally urged by means of spring 57 in the same direction as are push-buttons 25 to 29 inclusive. The alarm trip-rail carries an angularly bent arm 57' adapted to enter a slot 58 provided by the rod 30 and is further provided with a trip-rail 59 adapted to normally engage the face of cam 44 and the upper end of bridge-rail 46.

Let it be assumed that the several elements are in their respective positions, as shown in Figure 3 and further assuming that rod 30 is moved upwardly into one of the openings 12 against the influence of spring 31 so that detent spring 38, corresponding to push-button 27 engages its adjacent lock notch 37, it being allowed to engage the lock notch without interferring with arm 41 or arm 40, the detent springs 38 corresponding to push-buttons 25, 26, 28 and 29 being retained out of engagement with their corresponding notches 37 due to their engagement with the longer arms 41 of the push-buttons and it is desired to release the steering wheel from its locked position. To release the steering wheel from its locked position push-button 27 is actuated against the influence of its spring 39 whereupon pin 40' is moved first into engagement with clasp 49, thereby moving cam-rail 42 against the influence of spring 45. As a result of the movement of cam rail 42 the spring member 59 is moved upward by reason of its engagement with cam 44, springs 57 being strong enough in tension to prevent movement of alarm trip-rail 56. When the spring 59 has passed clear of the end of bridge-rail 46 the pin 40' is moved into engagement with its corresponding slot 48 provided by the bridge-rail whereupon the bridge-rail 46 is moved without transmitting motion to the alarm trip-rail 56 in which instance the short arm 40 is moved into engagement with its corresponding spring detent 38, thereby disengaging said spring detent from its corresponding lock notch 37. Since the spring detents opposite push-buttons 25, 26, 28 and 29 are normally retained out of engagement with their corresponding lock notches 37 by reason of their normal engagement with the longer arms 41, the rod 30 is, upon the release of spring detent 38 with the notch 37 corresponding to push-button 27 moved downwardly under the influence of spring 31 whereupon the steering wheel 6 is unlocked. Should the person not knowing the combination push either or all of push-buttons 25, 26, 28 and 29 the pins 40' carried by the shorter arms 40 thereof would be brought into engagement with alarm trip-rail 56, thereby moving it against the influence of spring 57 to actuate lever 55, thereby tripping the trip 54, causing intermittent actuation of bell hammer 52 to sound the alarm. Should all of the push-buttons 25 to 29 inclusive be pushed simultaneously member 57' would prevent rod 30 from moving downward by virtue of the fact that it is moved in the slot 58 upon the movement of alarm trip-rail 56, the movement of alarm trip-rail 56 being brought about by the engagement therewith of the pins 40' carried by push-buttons 25, 26, 28 and 29. Under such circumstances not only would the rod 30 be prevented from moving under the influence of spring 31 but the alarm would be sounded also as a result of the actuation of alarm trip-rail 56 as hereinbefore described.

Should it be desired to change the combination and use some other push-button the cover plate 23 may be removed so that push-buttons 25 and 26 may be rotated through 180° to bring their pins 40' into the same position as pin 40' carried by push-button 27. The operation for this combination would be to push the button 27 first which would move member 59 as hereinbefore described so that bridge-rail 46 may be moved in which instance the short arm 40 of push-button 27 would disengage its corresponding spring detent 38 from its adjacent lock notch. The pushing of push button 27 is then followed by the actuation of push-buttons 26 and 25, these buttons being actuated without operating alarm trip-rail 56 to release their corresponding spring detent 38 from their adjacent lock notches 37. In the combination last referred to the spring clasps 49 may be allowed to remain in their respective positions shown in Figure 3 without altering or impairing the operation of the device as a whole.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, what I claim as new and desire to secure and protect by Letters Patent of the United States, is:

1. In a steering wheel lock and signal, a casing, an element fixed to rotate with the steering wheel post, a locking bolt slidable in the casing and normally engaged with the rotatable element to retain the same against rotation, a plurality of detents in the casing, any selected one of which engages the bolt to retain the same against disengagement from the rotatable element, a plurality of push buttons, a vertically disposed trip bar pivoted to swing on a horizontal axis, a signal including a pivoted actuating arm disposed in the path of the trip bar, and a plurality of elements carried by the push buttons, any selected one of which being disposed to clear the trip bar, the other being disposed in the path of the trip bar whereupon actuation of their respective push buttons the trip bar will be moved to engage the arm to actuate the signal.

2. In a steering wheel lock and signal, a casing, a rotatable element associated therewith and adapted to be fixed to rotate with the steering wheel post, a locking bolt within the casing and normally urged into engagement with the rotatable element to retain the same against rotation, a plurality of detents, any selected one of which being engaged with the bolt to retain the same in locked position, a trip bar extending parallel to the locking bolt and pivotally mounted within the casing, a signal including an outstanding pivoted actuating arm arranged in the path of the trip bar, a swinging element extending longitudinally of the locking bolt, an outstanding resilient arm carried by the trip bar and normally engaged by the swinging element to retain the trip bar against movement, a plurality of push buttons, any selected one of which being adapted to engage the selected detent to release the bolt, an outstanding element carried by each of the push buttons, the element carried by the selected push button being arranged to engage the swinging member, means operated by the selected push button to move the resilient arm out of the path of the swinging bar, the outstanding element carried by the remaining push buttons being disposed in the path of the trip bar and adapted to engage the same upon actuation of said buttons to move the actuating arm to operate the signal.

3. In a steering wheel lock and signal, a casing, a rotatable element associated therewith and adapted to be fixed to rotate with the steering wheel post, the rotatable element being provided with a plurality of openings, a locking bolt slidable in the casing and normally projected into any one of the openings to retain the rotatable element in locked position, a cam rail pivoted in the casing and extending longitudinally of the bolt, a swinging element movable parallel with the cam rail, a trip rail also pivoted in the casing and extending parallel to the locking bolt, a resilient arm extending from the trip bar and normally engaged by the cam rail and swinging element, a plurality of detents, any one of which engaging the bolt retains the same in locked position, a plurality of push buttons, and elements carried thereby for moving the cam rail to disengage the resilient arm from the swinging element to permit the operation of the selected push button to disengage the selected detent, a signal in the casing including an actuating element disposed in the path of the trip bar, the remaining outstanding elements being arranged in the path of the trip bar to actuate the same to operate the signal.

4. In a combined lock and signal, a casing, a rotatable element to be fixed to a member to be locked, a slidable bolt normally projected into engagement with the rotatable element to retain the same against rotation, a plurality of detents, any selected one of which being engaged with the bolt to retain the same in projected position, a bar having its ends extended at right angles and pivotally mounted within the casing, an upstanding cam element carried by the bar, a bridge rail pivoted in the casing and extending parallel to the bar, spring elements normally urging the bar and bridge rail in one direction, a signal in the casing and including a pivoted actuating arm, a trip bar pivoted in the casing and movable in the path of the actuating arm, an outstanding resilient member carried by the trip bar and disposed in the path of the cam element and bridge rail, and outstanding elements carried by the push buttons, certain of which being arranged in the path of the bridge rail and bar while any one or more of the remaining elements being arranged to engage their respective detents to release the bolt from projected position, the resilient arm being raised to clear the bridge rail upon movement of the bar by any one of the first mentioned outstanding elements to allow the trip rail to move into engagement with the actuating arm to operate the signal.

5. The combination with a steering wheel post, a casing through which the post extends, of a rotatable element fixed to rotate with the post and provided with a plurality of openings, a locking bolt normally urged into engagement with one of the openings, a plurality of detents, any one or more being engaged with the bolt to retain the same in locked position, a push button for each of the detents, a signal in the casing including an outstanding pivoted arm, a U-shaped trip arm hingedly mounted within the casing normally urged toward the actuating arm, a swinging bar, an upstanding cam element carried thereby, a swinging bridge rail disposed longitudinally of the swinging bar, an outstanding resilient member engaged by the swinging bar to normally retain the trip bar against movement, and a plurality of outstanding elements carried by the push buttons, certain of which elements being arranged to engage the swinging bar and bridge rail whereby the spring member will be caused to ride over the cam element to clear the bridge rail to permit the trip bar to move into engagement with the actuating arm to operate the signal.

ROBERT BRUCE HASTINGS.